United States Patent
Hoexter et al.

[11] 3,978,254
[45] Aug. 31, 1976

[54] CARRIER SLEEVE FOR PRINTING CYLINDER

[75] Inventors: Rolf Hoexter, Englewood, N.J.; Sidney Katz, Spring Valley, N.Y.

[73] Assignee: Mosstype Corporation, Waldwick, N.J.

[22] Filed: Jan. 27, 1975

[21] Appl. No.: 544,291

[52] U.S. Cl.................................. 428/36; 29/127; 101/375; 156/195
[51] Int. Cl.².......................................... B29D 23/12
[58] Field of Search................ 101/375, 426, 401.1; 29/127, 128; 156/195; 161/139; 428/35, 36, 178, 188

[56] References Cited
UNITED STATES PATENTS

| | | | |
|---|---|---|---|
| 2,536,243 | 1/1951 | Walker et al. | 156/195 X |
| 3,146,709 | 9/1964 | Bass et al. | 101/375 |
| 3,367,816 | 2/1968 | Mills et al. | 156/195 X |

Primary Examiner—Harold Ansher
Assistant Examiner—Henry F. Epstein

[57] ABSTRACT

A carrier sleeve for supporting flexible printing plates, the sleeve having a limited circumferential resilience, whereby when subjected to air jets emitted from the apertures in the wall of a printing cylinder, the sleeve is dilated to facilitate the application of the sleeve to the cylinder or its removal therefrom. The sleeve is constituted by three interlaminated layers, each formed by a helix of synthetic plastic tape. Two layers of the sleeve are wound at the same helix angle but are phase displaced relative to each other, whereby the air gap between the convolutions of one layer is bridged by the convolutions of the other, thereby sealing the gap and rendering the sleeve impermeable to air. The remaining layer is wound at an angle opposed to the helix angle of the other two, thereby strengthening and rigidifying the structure of the sleeve.

4 Claims, 8 Drawing Figures

CARRIER SLEEVE FOR PRINTING CYLINDER

BACKGROUND OF INVENTION

This invention relates generally to carrier sleeves receivable on flexographic printing cylinders, and more particularly to an improved carrier sleeve which is impermeable to air and which maintains its circular shape even when removed from the printing cylinder.

In the flexographic printing process, flexible printing plates formed of rubber or other elastomeric material are mounted on a printing cylinder, the plates being inked to make an impression on the paper sheets engaged thereby. In the conventional arrangement, once the flexographic printing plates are adhered to the printing cylinder, the cylinder is capable of running only one job. In order to run a different printing job, one must replace the cylinder with a cylinder having printing plates mounted thereon appropriate to this job. Hence one requires as many printing cylinders for the press as there are jobs to be run. The need for a multitude of printing cylinders adds substantially to operating expenses.

In order to facilitate the running of different printing jobs in succession on the same press by means of a common printing cylinder, a technique has been developed in which instead of adhering the plates directly onto the printing cylinder, the plates are supported on a carrier sleeve which is received by the cylinder and is removable therefrom. To run a different job with the same printing cylinder, it is merely necessary to replace the carrier sleeve with a sleeve carrying the appropriate flexographic plates.

This technique is disclosed in U.S. Pat. No. 3,146,709 of Bass et al., wherein use is made of a hollow printing cylinder having a pattern of apertures formed therein, such that when the interior chamber of the cylinder is coupled to a compressed air generator, air is caused to escape in small, high-velocity jets from the apertures. The apertured cylinder cooperates with a sleeve that is dimensionally stable in the longitudinal direction, the sleeve having a limited circumferential resilience so that it may be expanded slightly.

In order to mount the carrier sleeve on the apertured cylinder, the cylinder is set vertically on a suitable stand and its interior chamber is filled with compressed air. One end of the sleeve is manually slipped over the upper end of the cylinder, the air jets emerging from the apertures serving to slightly stretch the sleeve and to interpose a lubricating air film between the inner surface of the sleeve and the outer surface of the cylinder. This air film makes it possible to pull the sleeve down along the cylinder until it is properly in place thereon. At this point, the air is cut off and the sleeve, which is no longer subject to dilation, contracts to its normal diameter into tight frictional contact with the cylinder.

After the job is completed on the press, the cylinder and sleeve assembly may be returned to the stand. The air pressure is again turned on to slightly dilate the sleeve, making it possible to slide the sleeve off the cylinder, and to replace the removed sleeve with a new sleeve appropriate to the next run.

The Bass et al. patent discloses a sleeve made from a sheet of polyester film in combination with a helically-wound paper tape. Because of certain practical drawbacks inherent in the use of paper, such sleeves are not presently in commercial use. Carrier sleeves that are currently employed in conjunction with flexographic printing cylinders are fabricated entirely of synthetic plastic film material.

Existing carrier sleeves are formed from a rectangular sheet of film material whose opposite edges are adjoined to define an inner tube. A strip of plastic tape having an adhesive layer thereon is helically wound about the inner tube to define a first helix thereabout. Wound in the opposite hand about the first helix is a second strip of plastic tape having an adhesive layer thereon to define a second helix.

Since the adjoining edges of the inner tube necessarily have a slight spacing or air gap therebetween to avoid overlap of the edges that would produce a sleeve of uneven thickness, the wall of the inner tube is not entirely impermeable to air. The first helix, though wound about the inner tube, does not completely close the longitudinal gap in the inner tube in that the slight spaces between adjacent convolutions of the helix give rise to leakage paths. And while the convolutions of the second helix intersect those of the first helix and partly close the spaces between the convolutions of the first helix, the spaces between the convolutions of the second helix produce leakage openings which, though quite small, are nevertheless permeable to air and degrade the air film created between the sleeve and the printing cylinder.

Thus with existing types of sleeves, the presence of leakage paths in the sleeve somewhat reduces the effectiveness of the lubricating air film produced by the air jets emerging from the cylinder. But a more serious drawback arising from such leakage is that the resultant air jets impinge on the adhesive holding the printing plates to the sleeve, causing bubbles to form therein, which weaken the bond and loosen the plates.

Another drawback is a lack of cylindricity in existing types of sleeves. Because the inner tube of this sleeve is formed of a rectangular sheet of plastic film bent into tubular form, the sleeve, when free of the printing cylinder, assumes a "tear-drop" rather than a circular shape. Because of this non-circular shape, there is a tendency for flexible printing plates mounted on the sleeve to lift up at the apex of the tear-drop. Moreover, the lack of cylindricity makes it more difficult to slide the sleeve onto the perfectly circular printing cylinder.

Another limitation of existing sleeves which is imposed by the inner tube is that one cannot readily manufacture any length and diameter of carrier sleeve, for one must cut the sleeve material of the inner tube into rectangles or parallelograms to fit a specific diameter and length.

SUMMARY OF INVENTION

In view of the foregoing, it is the main object of this invention to provide an improved carrier sleeve for supporting flexible printing plates, the sleeve being dimensionally stable in the longitudinal direction and being slightly stretchable circumferentially whereby the sleeve may be applied or removed from an apertured printing cylinder producing air jets acting to dilate the sleeve.

More particularly, it is an object of this invention to provide a sleeve of the above type that holds its circular shape even when removed from the printing cylinder whereby printing plates mounted on the sleeve remain undisturbed during storage in the unsupported state, and are capable therefore, when the sleeve is reapplied to a printing cylinder, of printing with a quality equal to that attained when the plates were originally mounted.

A significant advantage of a sleeve in accordance with the invention is that because cylindricity is maintained, this facilitates assembly, since it makes it easier to pull the sleeve onto the leading edge of the printing cylinder when beginning to slide it on.

Also an object of this invention is to provide a carrier sleeve whose wall is impermeable to air, thereby avoiding leakage paths and producing a uniform lubricating air film between the sleeve and the apertured printing cylinder.

Still another object of the invention is to provide a carrier sleeve which lends itself to manufacture in any length and diameter as may be required by the flexographic industry.

Briefly stated, these objects are attained in a carrier sleeve formed by three interlaminated layers, each of which is constituted by a helically-wound plastic tape. Two of the helices are wound at the same angle but are phase displaced relative to each other, whereby the air gap between the convolutions of one helix are bridged by the convolutions of the other helix to seal this gap, the third helix being wound at the opposite helix angle whereby the convolutions thereof intersect the convolutions of the adjacent layer to impart strength and rigidity to the sleeve structure.

OUTLINE OF DRAWING

For a better understanding of the invention as well as other objects and further features thereof, reference is made to the following detailed description to be read in conjunction with the accompanying drawing, wherein.

DESCRIPTION OF INVENTION

Figure 1:
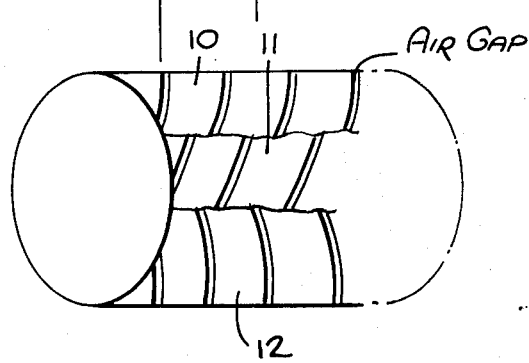
FIG. 1 is a perspective view of one embodiment of a carrier sleeve in accordance with the invention.

The usual practice in the flexographic industry, as pointed out previously, is to adhere the rubber printing plates directly onto the printing cylinder. This is accomplished by means of double-faced adhesive, one face of which engages the surface of the cylinder and the other the base of the printing plates. When using a carrier sleeve in the manner of the present invention, the printing plates are mounted on the sleeve by means of a double-faced adhesive, and the resultant assembly is received over the printing cylinder and held thereon by frictional contact.

In general, it is important that the thickness of the carrier sleeve represents an acceptable compromise which will afford sufficient structural rigidity in the unsupported state (i.e., demounted from the printing cylinder) to hold its shape during handling and storage, and yet be thin enough to conform to the plate thickness requirements of the user. Obviously, the thicker the sleeve, the greater its strength and rigidity, but in thickening the sleeve it not only becomes more difficult to dilate, but it also may raise the printing plates to an unacceptable height.

In the flexographic industry, the standard overall thickness or height of flexographic plates is 0.125 inches. This value is the sum of 0.105 inches (the thickness of the rubber plate) plus 0.020 inches (the thickness of the double-faced adhesive).

Metallic printing cylinders are "cut back" from the required printing diameter by twice the overall thickness of the printing plate. In order, therefore, to use a sleeve with existing cylinders and standard flexible printing plates and yet maintain the usual parameters, one must cut the thickness of the double-faced adhesive in half. By reducing the adhesive to 0.010 inches, 0.010 inches then becomes available for the sleeve thickness. In some instances where the printing circumference is not critical, the existing thickness of double-faced adhesive may be retained and the printing diameter increased by twice the carrier sleeve thickness.

A sleeve in accordance with the invention is constructed of three interlaminated layers, each formed by a helix of thin tape formed from synthetic plastic film material having the desired chemical and physical characteristics. The preferred type of film is polyester resin, for this high-strength, flexible material is resistant to corrosion, chemicals and solvents and has sufficient stretchability to permit limited circumferential dilation of the sleeve under air pressure. The invention is not restricted to sleeves formed of polyester tape, and may be made, for example, of polyvinyl chloride or polyvinyl acetate.

In order to interlaminate the three layers, two of the tapes forming the helical layers are adhesive-coated on one side, so that when the layers are wound one over the other, the layers are bonded together. The gauge of the film material is such as to produce a total sleeve thickness of about 0.010 to 0.014 inches.

In fabricating the carrier sleeve, use is made of a rotatable forming mandrel having a diameter which is the same as that of the printing cylinder for which the sleeve is intended, the mandrel having apertures therein to produce air jets when the interior thereof is pressurized. Cooperating with the forming mandrel is a tape-dispensing mechanism which is mounted on a carriage that is driven by a rotating screw and is caused to travel in a path parallel to the longitudinal axis of the forming mandrel.

The tape is helically wound on the forming mandrel in a manner whereby its lead equals the tape width plus the gap between the convolutions of the helix. The screw (or other driving mechanism) must, therefore, advance the tape-dispensing mechanism along the axis of the mandrel for a distance equal to the tape lead for every revolution of the mandrel.

The tangent of the helix angle, which represents the "payoff" angle of attitude of the tape dispensing mechanism with respect to the forming mandrel axis, is the tape lead divided by the circumference of the mandrel. It is important to keep the air gap between convolutions of the helix small relative to the tape width while avoiding overlap of the convolutions.

As noted previously, two of the three layer-forming tapes are coated on one side with adhesive. The first layer deposited on the forming mandrel is adhesive-coated with the coating facing up, so that the tape does not stick to the forming mandrel. The second layer, which is laid down over the first layer, has no adhesive coating thereon and is bonded to the underlying layer by its adhesive coating. The third layer is adhesive-coated and is deposited over the second or intermediate layer with its adhesive side down, thus adhering the third layer to the outer surface of the second layer.

Obviously, instead of using adhesive-coated tapes, one may apply an adhesive coating to the innermost tape after it has been wound on the mandrel and before the second tape is wound thereover, and one may do likewise with the exposed surface of the intermediate helix before the third tape is wound thereover.

The First Embodiment

The sequence and direction of deposition of the three tape layers may be carried out in one of two ways. The first method of deposition results in a sleeve (first embodiment) having the formation shown in FIG. 1, wherein the sleeve has a first or innermost layer 10, a second or intermediate layer 11 and a third or outermost layer 12.

Figure 2:
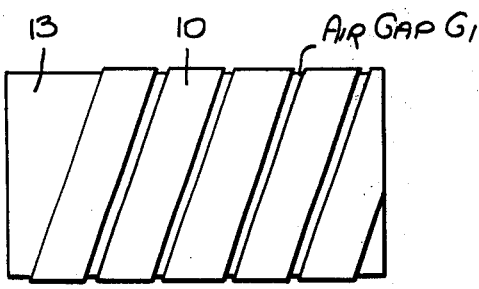
FIG. 2 illustrates the first step in forming the first embodiment of the sleeve.

Step I. On order to form a sleeve having this formation, the first tape 10 is wound about a forming mandrel 13, as shown in FIG. 2, the winding of the tape starting at the left-hand end of the mandrel and proceeding toward the right-hand end to define a right-hand helix.

Figure 3:
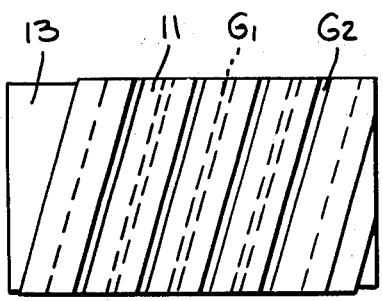
FIG. 3 illustrates the second step in forming this sleeve.

Step II. In forming the second layer, as shown in FIG. 3, one again starts at the left-hand end of mandrel 13. But while this layer is wound at the same right-hand helix angle as that of the first layer 10, the start of the second tape is shifted by one-half of the lead, so that the convolutions of the second layer are displaced in phase relative to those of the first layer.

Because of this phase displacement, the convolutions of the second layer 11 bridge the air gap $G_1$ between the convolutions of first layer 10 and thereby seal this gap to render the sleeve impermeable to air. The air gap $G_2$ of second layer 11 is sealed by convolutions of the underlying layers, hence there is no leakage through this gap.

Step III. In forming the third or outermost layer 12, one starts at the right hand of forming mandrel 13 at an equal but opposite angle to the helix angle of the underlying layer. As a result, the convolutions of the third layer 12 intersect those of the second layer 11 to strengthen and rigidify the sleeve structure.

The ends of the three-layer sleeve generated by steps I, II, and III are then trimmed, after which fluid pressure is applied to the apertured forming mandrel to dilate the sleeve and permit the removal thereof from the mandrel. Obviously, one may use an existing apertured printing cylinder as a forming mandrel for making sleeves.

Second Embodiment

Figure 5:
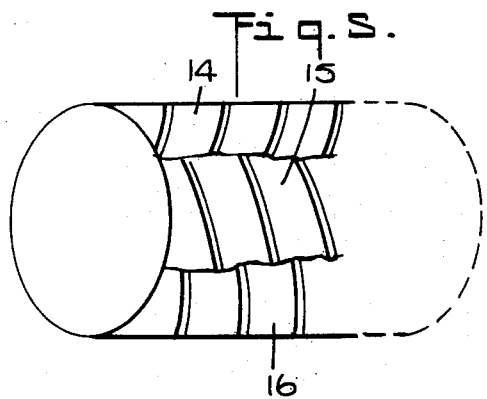
FIG. 5 is a perspective view of a second embodiment of a carrier sleeve in accordance with the invention.
Figure 6:
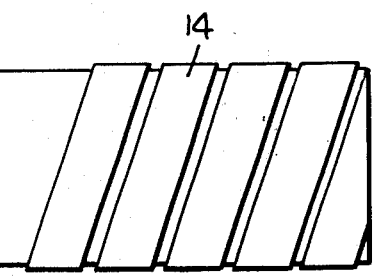
FIG. 6 illustrates the first step in forming the second embodiment of the sleeve.
Figure 7:
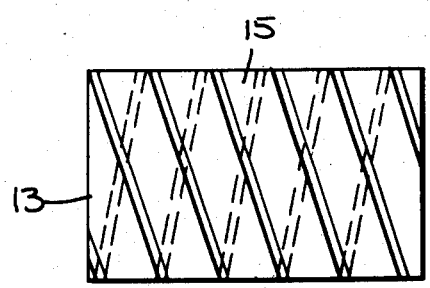
FIG. 7 illustrates the second step in forming this sleeve.
Figure 4:
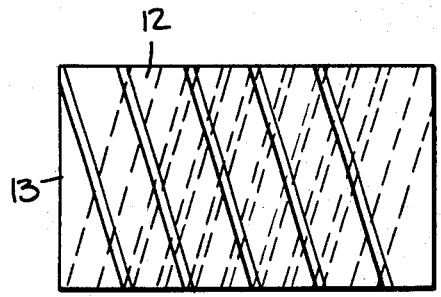
FIG. 4 illustrates the third and final step of forming this sleeve.

The second embodiment of the sleeve is shown in FIG. 5. The innermost layer 14 of this sleeve, as shown in FIG. 6, is wound in the same fashion as the innermost layer 10 in the first embodiment and hence is made by Step I. The intermediate layer 15, as shown in FIG. 7, is wound in the same fashion as the outermost layer 12 of the first embodiment and is therefore made by Step III. Thus, in the second embodiment, the convolutions of the intermediate layer 15 intersect the convolutions of the first layer 14 and do not close the air gap thereof.

Figure 8:
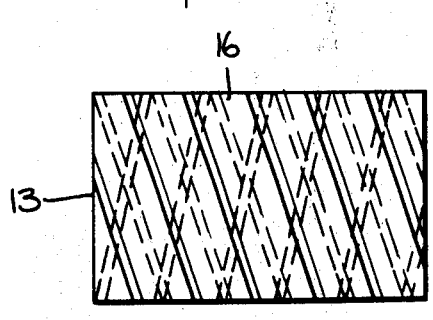
FIG. 8 illustrates the third and final step in forming this sleeve.

The outermost layer 16, as shown in FIG. 8, is wound over the intermediate layer 15 by starting at the right-hand end of the forming mandrel and by shifting the start of the third tape by one-half the lead. The third or outermost tape is wound at the same left-hand helix angle as intermediate layer 15. Thus the convolutions of the third helix bridge the convolutions of the underlying second helix and thereby seal the diamond-shaped intersections between the first and second layers to prevent air leakage.

While there have been shown and described preferred embodiments of a carrier sleeve for printing cylinders, it will be appreciated that many changes and modifications may be made therein without, however, departing from the essential spirit thereof.

I claim:

1. A carrier sleeve having a circular form for supporting flexible printing plates, said sleeve having a predetermined length and having limited circumferential resilience whereby the sleeve is slidable over and removable from an apertured printing cylinder adapted to emit air jets serving to dilate the sleeve; said sleeve comprising three interlaminated layers each formed by a helix of flexible tape whose convolutions are separated by an air gap, said tapes being formed of thin synthetic plastic film material which is of high strength and is chemically inert, said material having sufficient stretchability to permit limited circumferential dilation of the sleeve under air pressure, two of said helices being wound at the same angle and being displaced in phase relative to each other, whereby the gap in one helix is bridged by the convolutions of the other helix to render the sleeve impermeable to air, the remaining helix being wound at a different angle which is equal and opposite to the angle of the two helices, whereby the convolutions thereof intersect the convolutions of the underlying helix to strengthen and rigidify the sleeve, said plastic film tapes having gauges producing an overall sleeve thickness of about 0.12 to 0.14 inches, said interlamination of said tapes being effected by an adhesive coating on the inner face of the outermost layer, whereby the innermost layer is bonded to the intermediate layer which is bonded to the outermost layer.

2. A sleeve as set forth in claim 1, wherein said tapes are fabricated from polyester film material.

3. A sleeve as set forth in claim 1, wherein said two helices are formed by the innermost and the intermediate layer of the sleeve and the remaining layer is formed by the outermost layer.

4. A sleeve as set forth in claim 1, wherein said two helices are formed by the intermediate and the outermost layer of the sleeve and the remaining layer is formed by the innermost layer.

* * * * *

UNITED STATES PATENT OFFICE
CERTIFICATE OF CORRECTION

PATENT NO. : 3,978,254
DATED : August 31, 1976
INVENTOR(S) : Rolf Hoexter, Sidney Katz It is certified that error appears in the above-identified patent and that said Letters Patent are hereby corrected as shown below:

Claim 1, column 6, line 45 change "0.12 to 0.14" to read -- 0.010 to 0.014 --

Signed and Sealed this

Fifth Day of April 1977

[SEAL]

Attest:

RUTH C. MASON
Attesting Officer

C. MARSHALL DANN
Commissioner of Patents and Trademarks